(12) United States Patent
Laroia

(10) Patent No.: US 7,313,193 B2
(45) Date of Patent: Dec. 25, 2007

(54) MULTI-TONE SIGNAL TRANSMISSION METHODS AND APPARATUS

(75) Inventor: Rajiv Laroia, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 09/943,811

(22) Filed: Aug. 31, 2001

(65) Prior Publication Data

US 2002/0176510 A1 Nov. 28, 2002

Related U.S. Application Data

(60) Provisional application No. 60/291,071, filed on May 15, 2001.

(51) Int. Cl.
*H04B 7/02* (2006.01)
(52) U.S. Cl. .................. 375/267; 375/299; 455/101
(58) Field of Classification Search ............ 375/267, 375/299, 347, 308, 144; 455/463, 101
See application file for complete search history.

(56) References Cited

U.S. PATENT DOCUMENTS

| | | | | |
|---|---|---|---|---|
| 5,668,802 | A * | 9/1997 | Chalmers et al. | 370/276 |
| 5,903,857 | A * | 5/1999 | Behrens et al. | 702/190 |
| 5,914,933 | A * | 6/1999 | Cimini et al. | 370/208 |
| 6,005,876 | A * | 12/1999 | Cimini et al. | 370/525 |
| 6,347,127 | B1 * | 2/2002 | Chen | 375/348 |
| 6,876,675 | B1 * | 4/2005 | Jones et al. | 370/509 |
| 2002/0154705 | A1 * | 10/2002 | Walton et al. | 375/267 |

OTHER PUBLICATIONS

"Introduction to OFDM, II edition: OFDM as a possible modulation technique for multimedia applications in the range of mm waves" Oct. 30, 1998 p. 11-12 (guard interval and its implementation) Dusan Matiae.*
"ADSL/VDSL Principles" Sr. Dennis Rauschmayer MTP 1999 pp. 202 and 225.*
ITU G.992.1 (Jun. 1999) Recommendation ADSL transceivers) pp. 53.*

* cited by examiner

*Primary Examiner*—Mohammed Chavour
*Assistant Examiner*—Juan Alberto Torres
(74) *Attorney, Agent, or Firm*—Straub & Pokotylo; Michael P. Straub; Ronald P. Straub

(57) ABSTRACT

Methods and apparatus for generating multi-tone signals, e.g., OFDM signals, are described. Analog signals corresponding to individual tones of a multi-tone signal are separately generated and filtered. Different prefixes are generated for each of the multiple tones. The prefixes for all the tones are of the same duration. One signal prefix is generated for each tone during each symbol transmission period. Each prefix may include multiple parts with a first part being generated from a current symbol and the second part being generated from the preceding symbol. By generating each multipart prefix from the periodic signal representing the current symbol and the periodic signal representing the preceding symbol, a smooth signal transition will occur at the point one symbol transmission period stops and the next one begins. Separate antennas are used to transmit signals corresponding to different tones of a multi-tone signal with the signals combining in the communications channel.

81 Claims, 11 Drawing Sheets

$\theta_k=0$ $\theta_k=\pi$

MULTI-TONE SIGNAL TRANSMISSION METHODS AND APPARATUS

RELATED APPLICATIONS

The present invention claims the benefit of the filing date of U.S. Provisional Patent Application Ser. No. 60/291,071 filed May 15, 2001.

FIELD OF THE INVENTION

The present invention relates to communications systems and, more particularly, to methods and apparatus for communicating information using multi-tone signals, e.g., orthogonal frequency division multiplexed (OFDM) signals.

BACKGROUND

The use of multi-tone signals for the communication of information has been proposed for quite some time. In such systems, a plurality of tones are used to communicate symbols in parallel, with the total bandwidth between a transmitter and receiver device being a function of the number of tones being used to communicate the information.

Generally, a multi-tone signal includes N (N>0) complex symbols modulated on N distinct tones simultaneously in a symbol duration T:

$$s(t) = \sum_{k=1}^{N} A_k \cos(2\pi f_k t + \theta_k), \text{ for } t = [0, T].$$

In the above equation, $\theta_k$ and $A_k$ are respectively the phase (in radians) and amplitude of the complex symbol to be transmitted on tone k, and $f_k$ is the frequency of tone k. t is the time variable. A multi-tone signal comprises a plurality of single-tone signals, where each single-tone signal is a periodic signal. In a practical system, the periodic signals are transmitted for a symbol duration T, which is a finite time interval.

An OFDM signal is an example of the multi-tone signal with each distinct tone k representing a different subcarrier. In an OFDM signal the distinct tones which are used to form the OFDM signal are orthogonal over the symbol duration.

FIG. 1 illustrates a known OFDM transmission system 1. In the known system, for each period in which a symbol is to be transmitted, a digital complex symbol generator 2 generates a vector of digital complex symbols. The vector includes, e.g., one symbol per OFDM tone to be used. The vector of complex symbols are then transformed into a vector of complex time domain samples corresponding to a symbol period by an Inverse Fourier transform operator 3, e.g., an Inverse discrete or Inverse Fast Fourier Transform (IFFT) circuit. The time domain samples represent the discrete samples of the baseband signal to be transmitted during a symbol transmission period. This signal is essentially the sum of one or more sinusoid component signals, e.g., the OFDM tones. A single cyclic prefix is generated for the signal to be transmitted during a symbol transmission period. The cyclic prefix is added by the cyclic prefix generator 4 to the vector of time domain samples supplied by the Inverse Fourier transform operator 3. Generally, the cyclic prefix is usually a copy of the last few samples in the vector of the time domain samples and will therefore include all the OFDM signal's sinusoid components, e.g., tones.

After the cyclic prefix is appended to the beginning of the samples supplied by the Inverse fourier transform operator 3, the signal samples pass through a filter 5. The filter 5 is used to limit out of band spectral emissions. The filtered samples are then converted to an analog signal by a digital to analog converter 6. The analog signal is then mixed with the carrier frequency by mixer 7 to generate a passband signal. The passband signal is then power amplified by amplifier 8 and transmitted to a communication channel through a single antenna 9.

Accordingly, in the known system shown in FIG. 1, a periodic sinusoidal signal to be transmitted is generated in the baseband, a cyclic prefix is added in the baseband, and then the signal is mixed to the passband prior to OFDM signal transmission.

While the concept of using a multi-tone or OFDM signal to communicate information is relatively well understood, the existing techniques for transmitting such a signal tend to be inefficient in terms of power utilization. The power inefficiency results from the multi-tone signal being a sum of a plurality of single tone signals, which normally leads to a high peak-to-average ratio in the resultant multi-tone signal. As a result, there is a need for improving the transmission techniques of multi-tone signals, e.g., OFDM signals. It is desirable that at least some new transmission techniques increase the power efficiency of multi-tone signals thereby making them better suited for use in systems such as wireless communication networks where long battery life and inexpensive power amplifiers of wireless devices are highly desirable.

SUMMARY

The present invention is directed to methods and apparatus for generating and transmitting multi-tone signals, e.g., OFDM signals in accordance with the present invention.

In accordance with the present invention, a plurality of tones are used to communicate information represented by symbols, in parallel. One symbol is transmitted per symbol transmission period for each tone used. In accordance with various aspects of the present invention, separate analog signals, e.g., N periodic signals, one per tone being used, are generated in parallel. Each separate analog signal may be generated from a different digital complex symbol.

Generation of the separate analog signals corresponding to a tone comprises generating a periodic signal corresponding to a digital complex symbol, generating a prefix for the generated periodic signal, filtering the periodic signal with prepended prefix and transmitting the filtered signal.

In many embodiments, the periodic signals used to represent symbols are sinusoidal waves. However, in some embodiments the periodic signals are square waves. Each of the N generated periodic signals corresponds to a different tone. In accordance with the present invention, each periodic signal may include in addition to a component at its fundamental frequency, e.g., the frequency of the tone, one or more high order harmonics. The high order harmonics include, e.g., signal components at integer multiples of the fundamental frequency.

In various embodiments of the invention, the period signal representing the symbol to be transmitted is generated in the passband. A prefix, e.g., cyclic prefix is then generated and added to the periodic signal in the passband. The passband corresponds to the range of frequencies in which the information is transmitted into the communications channel while the baseband corresponds to the frequency band of the modulating signals used in a transmitter.

This approach is in sharp contrast to known OFDM signal generation techniques such as that shown in FIG. 1 where the periodic sinusoidal signal to be transmitted is generated in the baseband, a cyclic prefix is added in the baseband, and then the signal is mixed to the passband prior to OFDM signal transmission.

Since prefixes are generated separately for each tone, while the prefixes for N tones being transmitted during the same symbol transmission period will have a prefix of the same duration, the content of the prefix will vary from tone to tone for a given symbol transmission period. This, is in sharp contrast to the prior art OFDM system discussed above, wherein the signals corresponding to different tones are effectively combined prior to prefix generation resulting a single prefix being generated for a signal corresponding to multiple tones.

Various features of the present invention are directed to novel techniques for generating prefixes for signals corresponding to individual tones and to provide for a relatively smooth signal transition between periodic signal portions used to represent symbols which are transmitted sequentially, e.g., in consecutive symbol transmission periods. In order to achieve the desired smooth signal transitions between transmitted periodic signals representing consecutive symbols transmitted using a particular tone, each prefix is divided into multiple parts in accordance with one feature of the present invention. The different parts of a multi-part prefix are generated from different data and/or using different generation techniques.

Accordingly, the prefix generation techniques of the present invention differ from the known systems not only by the fact that a different prefix is generated for each tone being used but also by the fact that, at least in some embodiments, prefixes are multi-part prefixes as opposed to single part prefixes.

In particular embodiments, the first part of a cyclic prefix is generated from a periodic signal representing a current symbol, e.g., to cyclically extend the periodic signal representing the current symbol. However, the second part of the prefix is generated to smoothly, e.g., continuously, connect the end of the periodic signal portion representing a previous symbol and the first part of the cyclic prefix generated for the current symbol. Accordingly, the first part of a multi-part prefix represents a cyclic prefix portion while the second part of the prefix represents a continuity portion.

By avoiding abrupt signal transitions between signals transmitted during consecutive symbol transmission periods through use of a multi-part prefix, out of band spectral emissions can be reduced and/or eliminated as compared to cases where abrupt changes occur at the transition between symbol transmission periods.

To insure a smooth signal transition, in some embodiments the $2^{nd}$ part of a multipart prefix is generated as a function of the periodic signal representing the preceding symbol and the $1^{st}$ part of the prefix generated from the periodic signal portion representing the current symbol. As discussed above, the $1^{st}$ part of a multi-par prefix is generated from the periodic signal portion representing a current symbol. Thus, in accordance with the present invention, multi-part prefixes are generated as a function of the periodic signal representing the current symbol to be transmitted and the periodic signal representing the preceding symbol to be transmitted.

Various exemplary techniques for generating multi-part prefixes in accordance with the present invention are discussed below.

The independent generation and processing of signals corresponding to different tones of a multi-tone signal provides advantages in terms of power efficiency over the known system since the individual signals tend to have a better peak to average power ratio than the signal of the known system which corresponds to multiple tones.

In accordance with one particular feature of the present invention, different antennas are used to transmit signals corresponding to different tones of a multi-tone signal during the same symbol transmission period. The individual transmitted signals combine in the communications channel, e.g., air, to form the multi-tone signal which is received by a receiver, e.g., using a single antenna. In one embodiment, a separate antenna is used to transmit each tone of a multi-tone signal. Accordingly, in such an embodiment, where N tones are used in a multi-tone signal, N antennas are used to generate N separate signals. In other embodiments, tones are combined into groups, e.g., tone subsets, for transmission purposes by multiple antennas. For example, assuming a multi-tone signal with N tones is to be transmitted, the signals to be transmitted may be combined into M distinct signals, with the M signals being transmitted using M antennas where N>M>1.

Numerous additional features and embodiments relating to the generation and transmission of multi-tone signals, e.g., OFDM signals, are discussed in the detailed description which follows.

DETAILED DESCRIPTION

Figure 2:
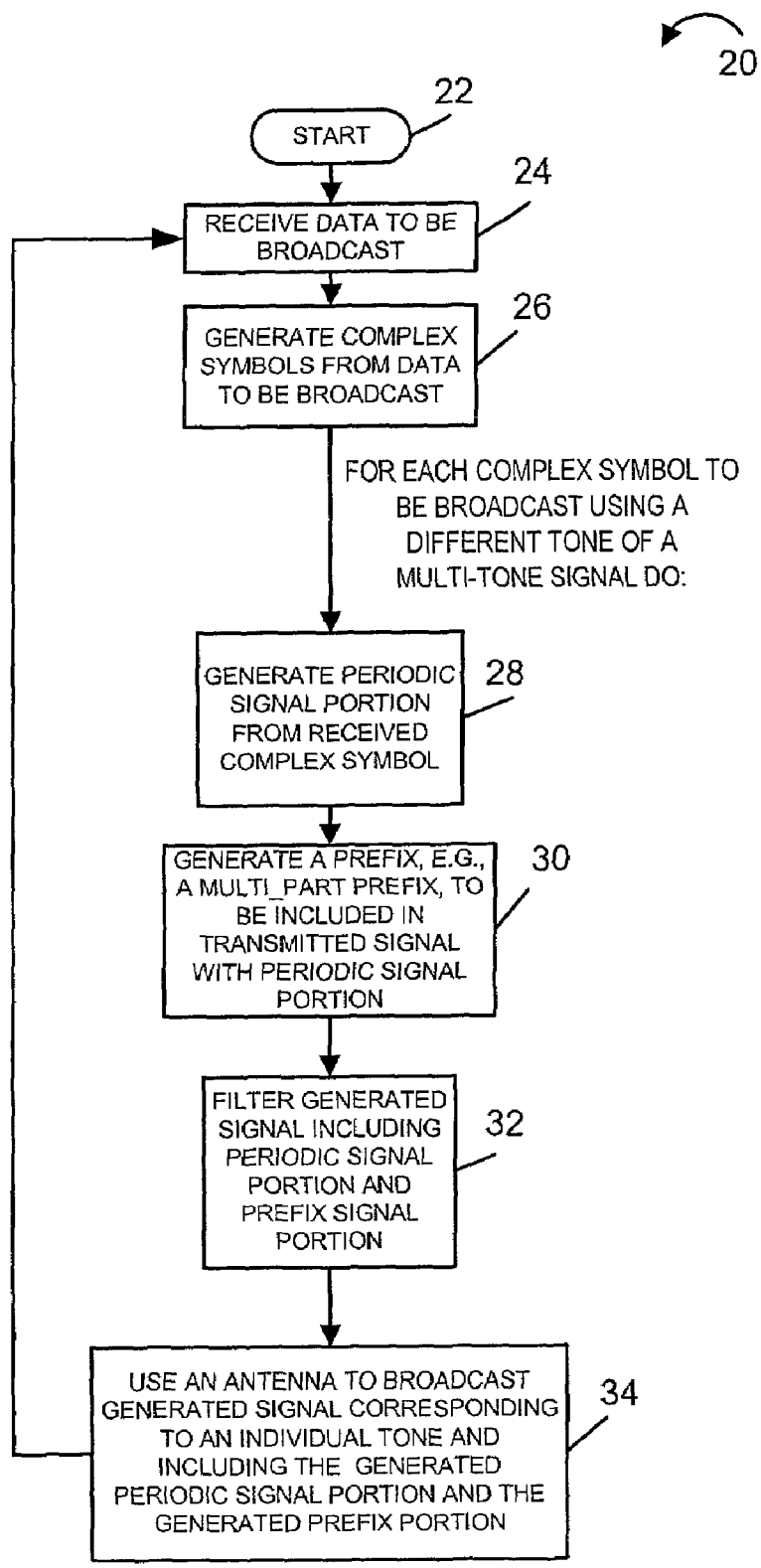
FIG. 2 is a flow chart illustrating a method of generating and transmitting a multi-tone signal in accordance with an exemplary embodiment of the present invention.

FIG. 2 is a flow chart illustrating a method 20 of generating and transmitting multi-tone signals in accordance with the invention. As illustrated, the method 20 starts in START step 22, e.g., with a signal generation and transmission system of the present invention being initialized. Operation proceeds from step 22 to step 24, wherein the digital data to be broadcast is received. Next, in step 26, from the received data a plurality of digital complex symbols which are to be transmitted in the same symbol duration are generated. One digital complex symbol is generated for each tone of the multi-tone signal to be broadcast. The plurality of digital complex symbols generated in step 26 are processed in parallel in steps 28, 30, 32, and 34 to generate analog signals, which are suitable for transmission using different tones of a multi-tone signal. Transmission may be over a communications channel such as the air.

In accordance with the present invention, each analog signal which is broadcast over the communications channel includes a periodic signal portion and a prefix signal portion. In step 28, the periodic signal portion of an analog signal is generated from the digital complex symbol. Then, in step 30, the prefix signal portion of an analog signal is generated. The prefix portion and the periodic signal portion of the generated analog signal to be broadcast are combined, e.g., the periodic signal portion is appended to the beginning of the prefix portion, in step 30 or subsequent thereto, to create the analog signal to be broadcast. Then, in step 32, which is an optional filtering step, filtering is performed on the analog signal. With filtering completed, the analog signal including the periodic signal portion and prefix signal portion is transmitted in step 34 using an antenna. As will be discussed in detail below, in one embodiment of the invention, the analog signals corresponding to each tone of a multi-tone signal are transmitted in parallel using separate antennas, e.g., one per tone. The transmitted analog signals of all the tones are combined in the channel itself to form the multi-tone signal. Alternatively, prior to signal transmission, the analog signals corresponding to a plurality of different subcarriers, e.g., tones, can be combined for transmission by a single shared antenna. In accordance with the present invention, depending on the degree of multiplexing before transmission of analog subcarrier signals, the number of antennas used to broadcast a multi-tone signal may range anywhere from 1 to N where N is the number of tones in the multi-tone signal. In several embodiments, as will be discussed below, a plurality of antennas are used to transmit the different groups of tones which comprise a multi-tone signal. In such a case, the analog signals of a multi-tone signal broadcast using different antennas are effectively combined in the communications channel through which the subcarrier signals are broadcast.

Multiple antennas are used for transmission for purposes of power efficiency as opposed to avoid signal interference or to increase channel diversity as used in a known wireless communication system. Accordingly antenna spacing can be extremely close at the transmitter making multiple antennas in a portable device possible. Antenna spacing at a transmitter in terms of physical distance can range e.g., anywhere from one half the wavelength of any one of the tones (e.g., the tone having the shortest wavelength of in a set of N tones) being transmitted to as little as thousands of a wavelength or even less. Accordingly, in various embodiments antenna spacing, A, is as follows: Exemplary embodiment 1) A<½λ; Exemplary embodiment 2) A<¹/₁₀₀λ; and Exemplary embodiment 3) A<¹/₁₀₀₀λ, where λ is the wavelength of the tone in a multi-tone signal being broadcast, which has the shortest wavelength. A may be expressed in meters or feet or any other common unit of distance.

Steps 24-34 are repeated so that data can be transmitted over multiple symbol durations. Thus, steps 24-34 are normally performed for each symbol duration resulting in the transmission of data using multi-tone signals over a period of time.

Figure 3A:
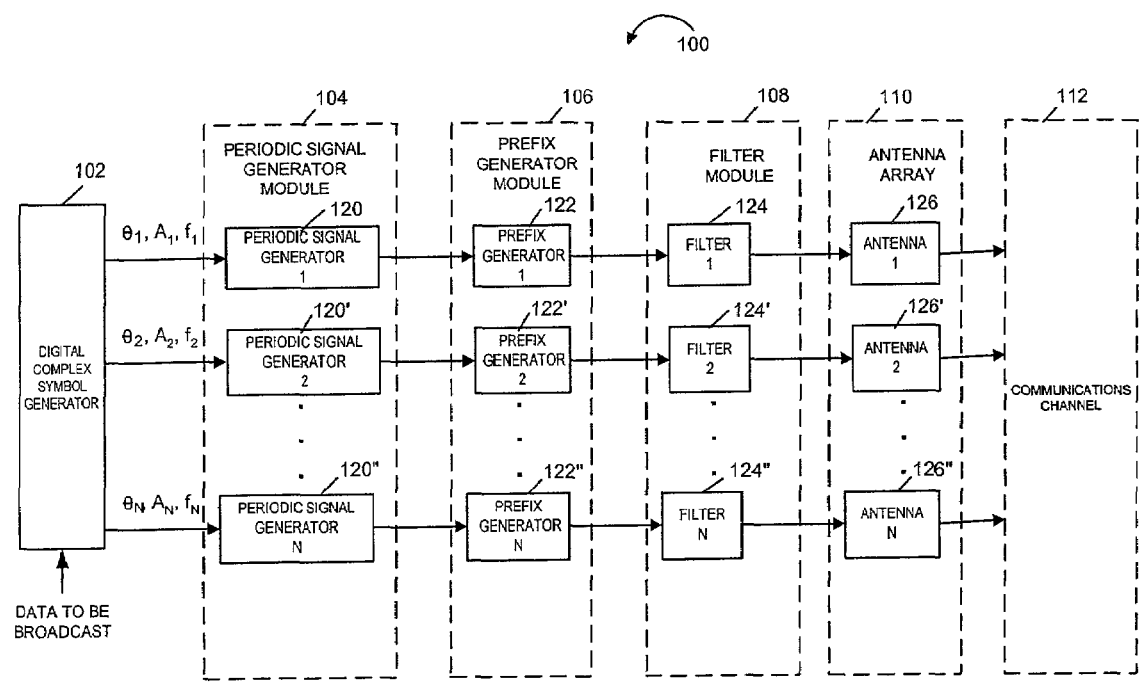
FIGS. 3A and 3B illustrate exemplary systems of the invention which can generate and transmit multi-tone signals in accordance with the method illustrated in FIG. 2.

FIG. 3A illustrates an exemplary multi-tone signal generation and transmission system 100 of the present invention. The system 100 can be used to implement the method 10 shown in FIG. 2. As illustrated, the system 100 includes a digital complex symbol generator 102 for generating, from received data to be broadcast, digital complex symbols, one for each subcarrier frequency $f_k$, where k extends from 1 to N. The system 100 also includes a periodic signal generator module 104, prefix generator module 106, filter module 108, and an antenna array 110 used to broadcast signals into communications channel 112, e.g., the air.

The periodic signal generator module 104 includes an array of N periodic signal generator circuits 120, 120', 120", one per subcarrier frequency $f_k$. Similarly, the prefix generator module 106 includes an array of N prefix generator modules 122, 122', 122" while the filter module includes an array of N filters 124, 124', 124". In the FIG. 3A embodiment the antenna array 110 includes one antenna per subcarrier frequency for a total of N antennas 126, 126', 126".

The digital complex symbol generator 102 generates a vector, e.g., set of N digital complex symbols, of $\{\theta_k, A_k, f_k\}$, for k=1, ..., N for each multi-tone symbol duration. The set of complex symbols $\{\theta_k, A_k\}$ for k=1, ..., N includes the portion of the received data to be transmitted during a single symbol duration.

Figure 1:
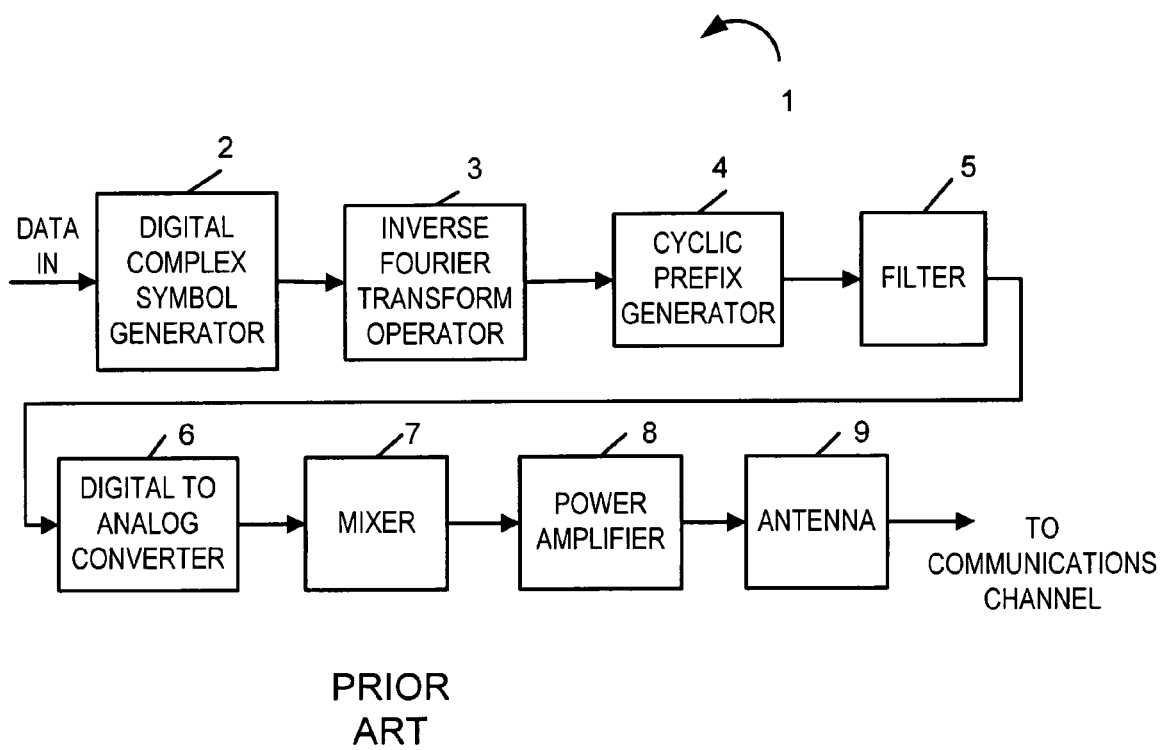
FIG. 1 illustrates a known OFDM transmission system where a single cyclic prefix is generated for each symbol period and wherein a single antenna is used to transmit an OFDM signal corresponding to multiple tones.

The digital complex symbol generator 102 may include several functional blocks, e.g., to generate information bits to be transmitted, to encode the information bits with channel coding, to interleave the encoded bits, and to map the bits to complex symbols with a modulation constellation. Such functional blocks can be constructed with the technologies known in the art and are thus not shown in FIG. 1.

Each complex symbol $\{\theta_k, A_k\}$ corresponding to frequency $f_k$ output by the symbol generator 102 is supplied to a corresponding periodic signal generator 120, 120', 120" of the periodic signal generator module. Each periodic signal generator 120, 120', 120" is used to independently process one complex symbol using a periodic signal of a given frequency $f_k$. Thus, at any given time, N different periodic signal generators are used to independently process different corresponding ones of the N complex symbols output by the signal generator 102 to generate N periodic signals of different frequencies $f_k$, where k=1 to N. While in some embodiments the frequencies $f_k$ are basedband frequencies, in other embodiments, the frequencies $f_k$ are passband ones rather than baseband ones.

In accordance with the present invention, each periodic signal generator 120, 120', 120" generates a periodic signal $s_k(t)$ for the symbol duration T, where the frequency is equal to $f_k$. Each generated periodic signal is represented by the following Fourier series:

$$s_k(t) = \sum_{l=1}^{\infty} A_{k,l} \cos(2\pi l f_k t + \theta_{k,l}), \text{ for } t = [0, T].$$

Preferably, the energy of the fundamental component, $$A_{k,1}^2,$$

is significantly greater than the total energy of all the high-order harmonic components, $$\sum_{l=2}^{\infty} A_{k,l}^2.$$

In addition, preferably the complex symbol $\theta_k$, $A_k$ is modulated on the fundamental component:

$$A_{k,l} = A_k, \theta_{k,l} = \theta_k.$$

In one particular embodiment, the periodic signal generated by each periodic signal generator 120, 120', 120" is a sinusoid signal, that is, all the high-order harmonic components are equal to zero ($A_{k,l}=0$, for $l=2, 3, \ldots$).

In another exemplary embodiment, the periodic signal generated by each periodic signal generator 120, 120', 120" is constructed from a basic square wave signal. In one such embodiment the basic square wave function is defined as $$sqr(f,t) = \begin{cases} 1 & t \in \left[\frac{2m}{2f}, \frac{2m+1}{2f}\right] \\ -1 & t \in \left[\frac{2m+1}{2f}, \frac{2m+2}{2f}\right] \end{cases}, \text{ for } m = 0, 1, K.$$

Figure 4:
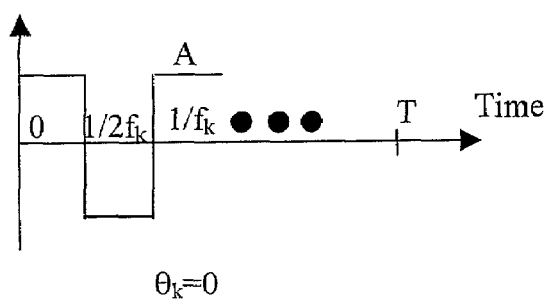
FIGS. 4 and 5 illustrate periodic signals generated in accordance with the present invention.
Figure 5:
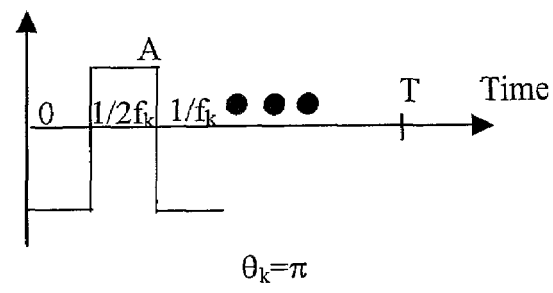

Here f is the frequency of the square wave function and t is the time variable. The phase and the amplitude of the generated periodic signal are set to be $\theta_k$ and $A_k$, respectively. Hence, the generated periodic signal can be expressed as:

$$A_k sqr\left(f_k, t + \frac{\theta_k}{2\pi f_k}\right),$$

for t=[0, T]. FIGS. 4 and 5 show two square wave signals with different phases which may be generated by periodic signal generators 120, 120', 120" in accordance with the present invention.

Figure 6:
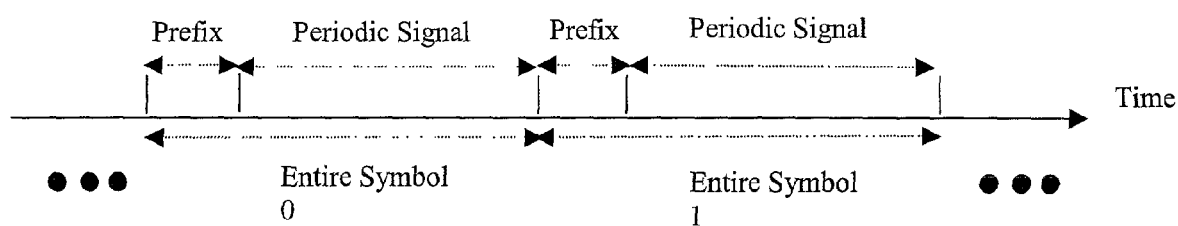
FIG. 6 illustrates two signals, each including a prefix and periodic signal portion, corresponding to one of N subcarrier tones of a multi-tone signal.

The periodic signal output by each periodic signal generator 120, 120', 120" is then passed to the corresponding prefix generator 122, 122', 122" which generates and inserts a prefix in front of the received periodic signal. As illustrated in FIG. 6, each signal to be transmitted comprises a prefix portion and a periodic signal portion. In a continuous transmission mode, successive signals representing different symbols are transmitted one after another. For example, FIG. 6 shows that symbol 0 and symbol 1 are two successive symbol durations and the prefix portion of symbol 1 follows immediately after the periodic signal portion of symbol 0.

Traditional OFDM systems sometimes use a cyclic prefix to cover channel transient response. Such conventional prefixes each comprise a single part, e.g., a cyclic prefix portion. Each prefix of the present invention is of sufficient duration that it covers at least the channel transient response. However, in accordance with the present invention the prefix is extended beyond the amount needed to cover the channel's transient response, e.g., beyond the duration of a conventional cyclic prefix, in order to maintain phase continuity in the transition between two successive multi-tone symbols. Accordingly, a prefix of the present invention includes multiple parts or portions, one to cover the channel's transient response and at least one other part or portion used, e.g., to maintain phase continuity. Various methods for generating a prefix, e.g., a multi-part prefix, in accordance with the present invention will be discussed in detail below with reference to FIGS. 7 to 11.

In the FIG. 3A system, the output of each prefix generator 122, 122', 122" is supplied to a corresponding filter 124, 124' 124". The filters 124, 124', 124" are used to control, e.g., out-of-band spectral emissions. Filters 124, 124' and 124" are optional and may be omitted if desired. Alternatively, in place of filters 124, 124' 124", or in addition to said filters, a set of N separate amplifiers may be used to independently amplify the individual signals corresponding to each of the N tones.

The signal corresponding to each tone output by filters 124, 124', 124" or the signal output by the prefix generator module 122, 122', 122" in the case where the filter module is omitted, are supplied to corresponding antennas 126, 126', 126" which transmit the signals corresponding to each tone of the multi-tone signal to the channel 112. In a wireless system, the channel would be the air.

In accordance with the various exemplary embodiments of the invention, the signals, e.g., including a periodic signal portion and prefix portion, for all the N tones in a multi-tone signal are not combined within the transmitter. Instead, as illustrated in the FIG. 3A embodiment, the signals of individual tones are transmitted to the channel through independent antennas and combined in the channel itself. In the exemplary wireless system of FIG. 3A, the signals corresponding to the N tones of the multi-tone signal are combined naturally over the air.

In the exemplary FIG. 3A embodiment, each of the signals of distinct tones are transmitted by different antennas. In such an embodiment, the number of independent antennas used by the multi-tone transmitter is equal to the number of tones to be transmitted as part of the multi-tone signal to be broadcast.

Figure 3B:
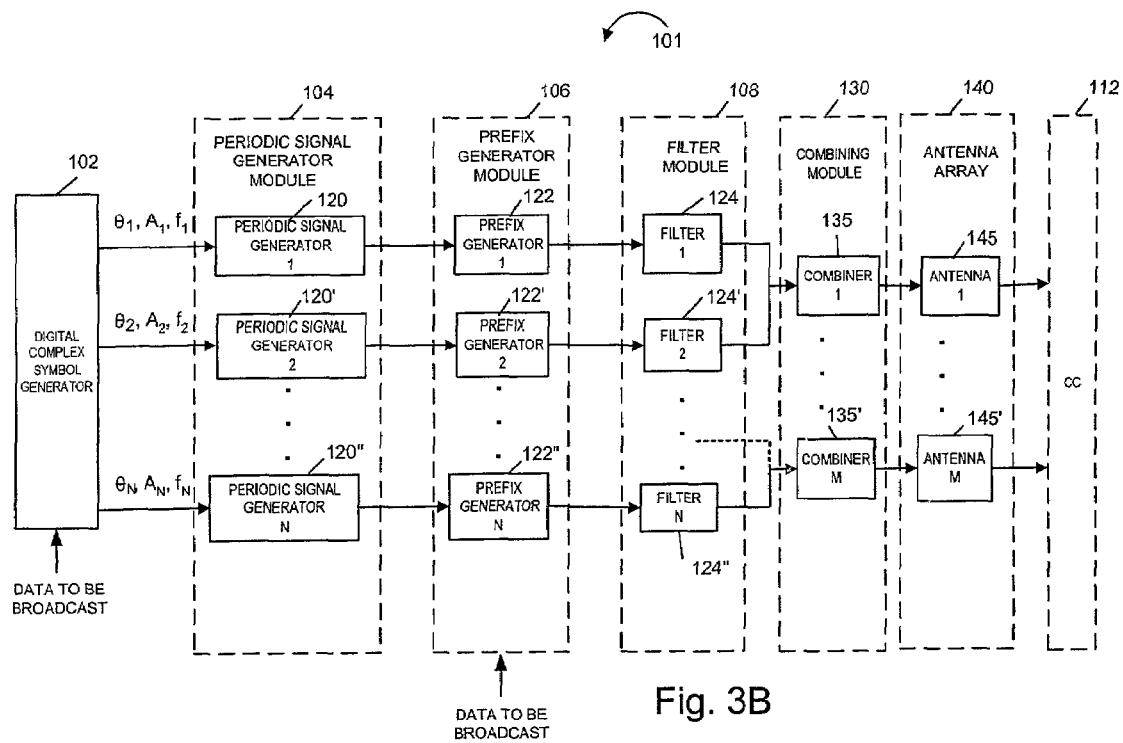

In another embodiment, e.g., the embodiment illustrated in FIG. 3B, the set of N tones which comprise a multi-tone signal are divided into several tone subsets. The signals of each tone subset are first combined within the transmitter, and then individually transmitted to the channel. The signals of different tone subsets are combined in the channel. The number of independent antennas needed by the multi-tone transmitter is therefore equal to the number of tone subsets, which is less than the number of tones to be transmitted.

The system 101 illustrated in FIG. 3B is similar to the system 100 of FIG. 3A. However, in the system 101, the signals corresponding to the N tones are grouped into M tone subsets, $M \geq 1$, with the signals in each of the M tone subsets being combined into a single signal prior to transmission. In the FIG. 3B embodiment, a combining module 130 which comprises M combining units 135, 135', one for each of the M tone subsets, is used to combine the signals of each tone group into a single signal prior to transmission. In one exemplary embodiment, the combining unit is an adder. Note that the antenna array 140 used in the system 101 includes M antennas 145, 145' as opposed to N antennas, where M<N. The signals broadcast by the M antennas combine in the communications channel 112 to form the multi-tone signal being broadcast.

Figure 7:
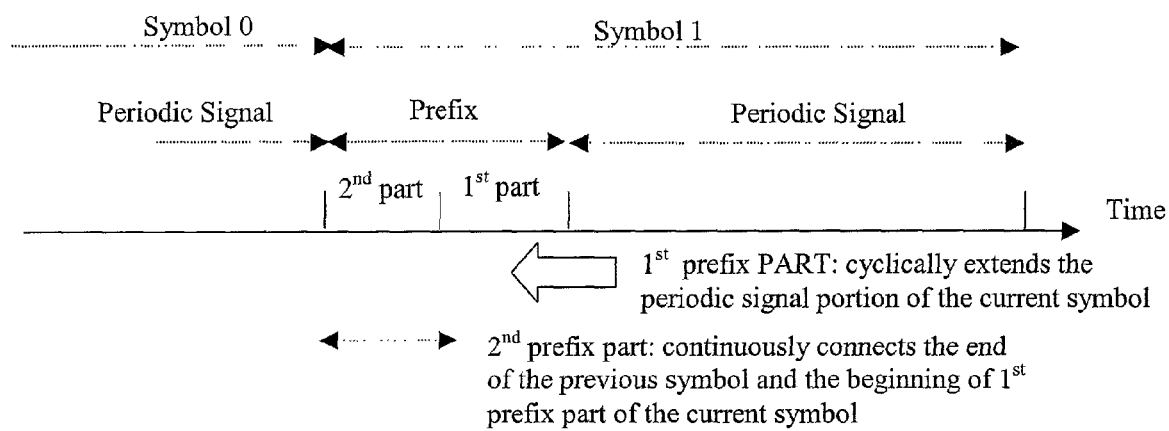
FIG. 7 illustrates a signal of one symbol duration, including a two part prefix and a periodic signal portion in accordance with the invention.

FIG. 7 illustrates the construction of a prefix in accordance with one embodiment of the present invention. As discussed above, each of the N prefix generators 122 operate in parallel to generate prefixes for the symbols being transmitted using the individual tones.

As described above, a signal representing an entire symbol to be transmitted comprises a prefix and a periodic signal portion. The prefix, in accordance with the invention includes multiple parts, e.g., two parts.

The $1^{st}$ part of a prefix, referred to herein as a $1^{st}$ prefix part, is used to cover channel transient response, thereby simplifying the channel equalization procedure in the receiver. The $1^{st}$ prefix part maybe the same as, or similar to, the cyclic prefix used in traditional OFDM systems and can be constructed by cyclically extending the periodic signal portion. Thus, methods for constructing the $1^{st}$ prefix part, e.g., cyclic prefix generation techniques, are known to the art and will not be discussed further herein.

In accordance with the present invention, the $2^{nd}$ prefix part is inserted in front of the periodic signal portion, e.g., ahead of the cyclic prefix portion, to continuously connect the end of a previous symbol and the beginning of the $1^{st}$ prefix part of the current symbol. This use of the $2^{nd}$ prefix part reduces or eliminates potential discontinuities in the transition between two successive symbols thereby reducing out-of-band spectral emissions that might otherwise occur.

The present invention contemplates several methods for constructing the $2^{nd}$ prefix part.

Figure 8:
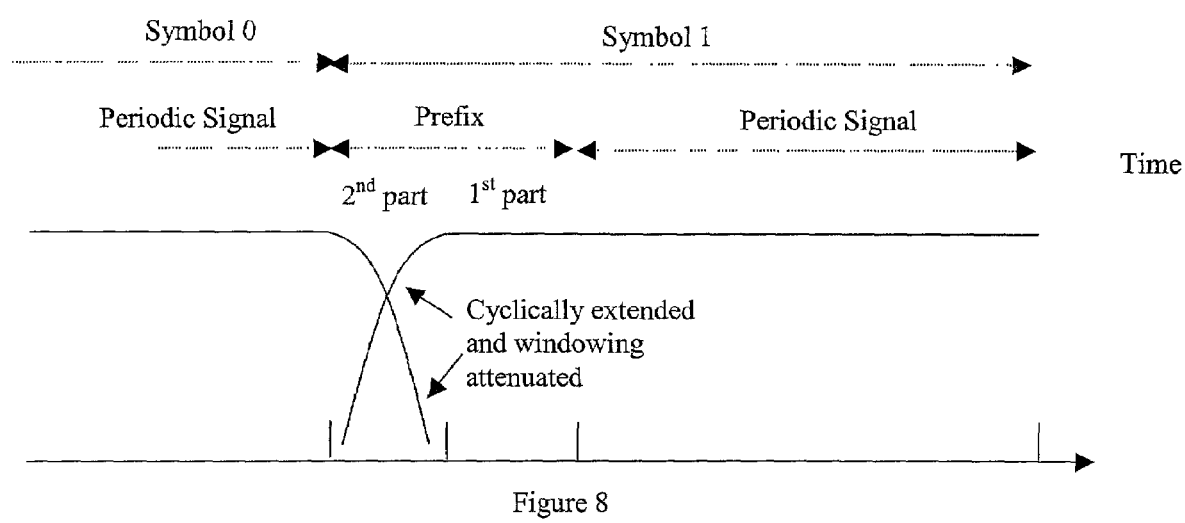
FIGS. 8 and 9 illustrate different methods of generating a two-part prefix in accordance with various embodiments of the invention.

In one embodiment, as illustrated in FIG. 8, the periodic signal portion of an immediately previous symbol is cyclically extended from the left into the $2^{nd}$ prefix part of the current symbol, and the extended portion is attenuated by a windowing function. In addition, the $1^{st}$ prefix part of the current symbol is also cyclically extended from the right into the $2^{nd}$ prefix part, and the extended portion is attenuated by another windowing function. The two extended portions are then added together to become the $2^{nd}$ prefix part of the current symbol. First and second filters included in each of the prefix generators 122, 122', 122" may be used to perform the windowing functions with an adder included in each of the prefix generators being used to perform the adding operation. The prefix generators 122, 122', 122" may also include cyclic prefix generation circuitry for generating the cyclic prefix portion of a multi-part prefix.

Figure 9:
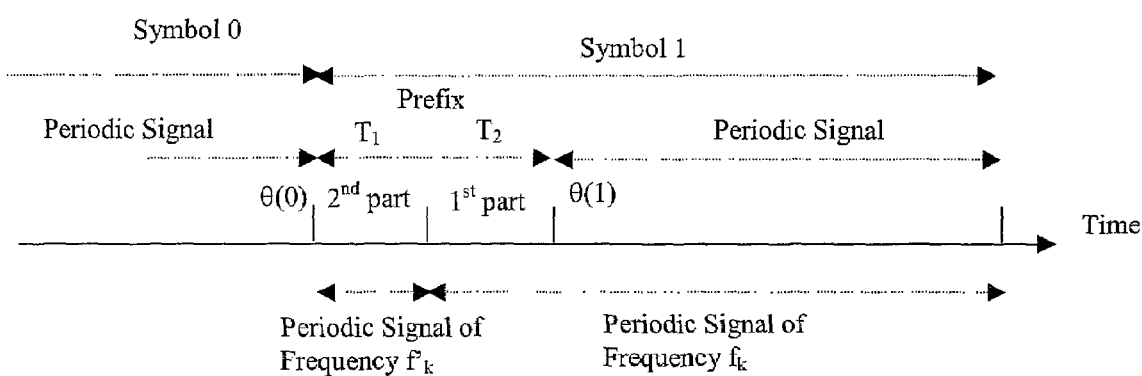

In another embodiment, illustrated in FIG. 9, the $2^{nd}$ part prefix is constructed by a periodic signal, whose frequency may be different from any tone $f_k$. The frequency and the phase of the new periodic signal is chosen to maintain phase continuity between the end of the previous symbol and the beginning of the $2^{nd}$ prefix part, and between the end of the $2^{nd}$ prefix part and the beginning of the $1^{st}$ prefix part.

Consider symbol 1 in FIG. 9 to be the current symbol. Denote $T_1$ and $T_2$ respectively the lengths of the $1^{st}$ and the $2^{nd}$ parts of the prefix. Suppose the phase at the end of the periodic signal portion of symbol 0 is $\theta(0)$, and the phase at the beginning of the periodic signal portion of symbol 1 is $\theta(1)$. The frequency of the tone in symbol 1 is $f_k$. Then at the beginning of the $1^{st}$ part prefix the phase is $\theta(1) - 2\pi f_k T_1$. The frequency $f'_k$ used in the the $2^{nd}$ part prefix satisfies the following equation:

$$2\pi f'_k T_2 = [\theta(1) - 2\pi f_k T_1 - \theta(0)] \mod 2\pi.$$

There are infinitely many solutions of the above equation. In one particular embodiment $f'_k$ is selected to minimize out-of-band spectral emission. In such an embodiment, the phase of the periodic signal in the $2^{nd}$ prefix part is such that the phase at the beginning of the $2^{nd}$ part prefix is equal to $\theta(0)$.

In some embodiments, the multi-tone transmitter 100, 101 transmits several consecutive sets of symbols using the same set of tones and then migrates to a different set of tones. Such systems are referred to as dwell systems. In such systems the term dwell is used to refer to the period of time for which the tone set is left unchanged.

In some dwell system embodiments, one periodic signal generator 120, 120' or 120" is used to generate the same $f_k$ during an entire dwell with one antenna being used to transmit the periodic signals of the same $f_k$ for all the symbols in the entire dwell.

Figure 10:
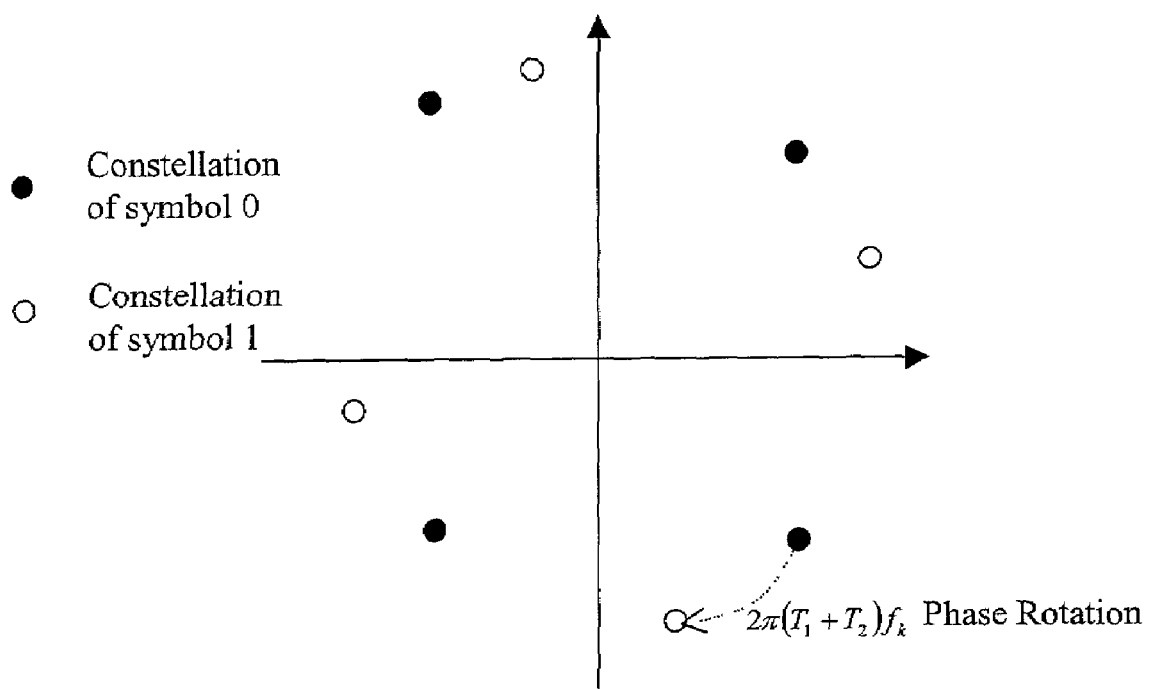
FIG. 10 illustrates the constellation corresponding to two consecutive symbol durations generated and transmitted in accordance with one embodiment of the present invention.

In such a system, for two successive symbols to be transmitted with tone $f_k$ within a dwell, the constellation of the latter symbol maybe, and in one embodiment is, clockwise rotated by $2\pi(T_1+T_2)f_k$. For example, suppose that QPSK (Quadrature Phase Shift Keying) is used for modulation and that symbol 1 follows immediately after symbol 0 within a dwell. FIG. 10 illustrates the constellation of those two symbols.

In dwell system embodiments, generally the symbols in a dwell can be all phase-rotated by a given amount without degrading system performance, for example, when differential modulation schemes are used across the dwell. In such an embodiment, constructing the first symbol in the dwell can be simplified as follows: The $2^{nd}$ prefix part is constructed by cyclically extending the $1^{st}$ prefix part without using a different frequency. Meanwhile, a phase rotation $\Delta\theta$ is added to all the symbols in the dwell such that the phase of the beginning of the $2^{nd}$ prefix part of the first symbol in the current dwell is equal to the phase of the end of the last symbol in the previous dwell.

Figure 11:
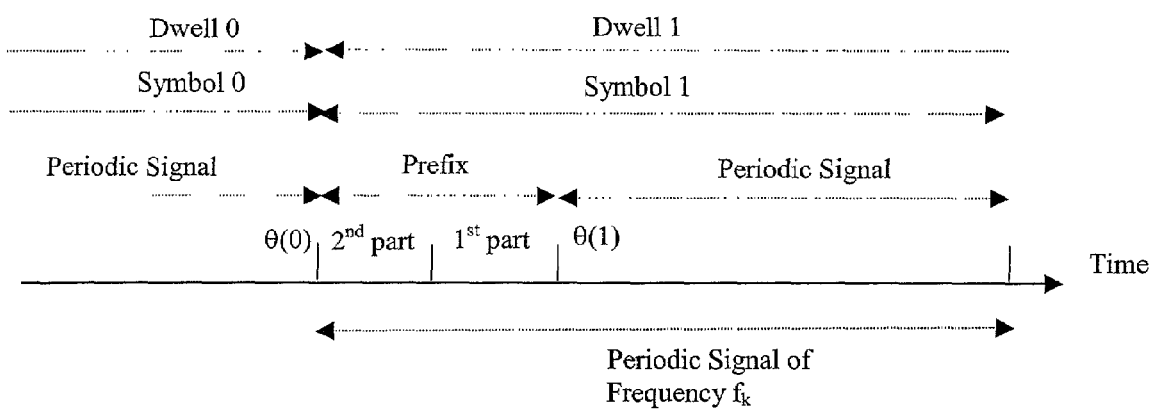
FIG. 11 illustrates the construction of the first symbol in a dwell and the determination of an amount of phase rotation to be used.

FIG. 11 illustrates the construction of the first symbol in the dwell and the determination of phase rotation amount. Suppose symbol 1 is the first symbol of the current dwell, and symbol 0 is last symbol of the previous dwell. The frequency of the tone in symbol 1 is $f_k$. Denote the phase at the end of symbol 0 to be $\theta(0)$, and the phase at the beginning of the periodic signal portion of symbol 1 to be $\theta(1)$ before phase rotation $\Delta\theta$ is added. The prefix ($1^{st}$ and $2^{nd}$ parts) of symbol 1 is constructed by cyclically extending the periodic signal portion. Phase rotation $\Delta\theta$ to be added to all the symbols in the dwell is given by the following equation:

$$\Delta\theta = \theta(0) + 2\pi f_k(T_1+T_2) - \theta(1).$$

Each of the periodic signal generators in the periodic signal generator module 104 include circuitry for generating periodic signals in accordance with the above described techniques of the present invention. Such circuitry may include, e.g., sinusoidal signal generators and squarewave generators. It may also include circuitry for making symbol selections and performing phase rotations on constellations from which symbols may be selected in accordance with the above described techniques. Processors, e.g., CPUs and memory including useful information such as phase shift amounts, etc and/or computer instructions in the form of a program used to control a processor, may also be used to implement the periodic signal generators. In a similar manner, each of the prefix generator circuits 122, 122', 122" include circuitry for generating and prepending multi-part prefixes to periodic signals in accordance with the various above described methods. A processor and a computer program may, and in some embodiments is, used to implement the prefix generators 122, 122', 122". In some embodiments the periodic signal generator module 104, prefix generator module 106 and filter module 108 are implemented as part of a single digital signal processor circuit.

Notably, the power efficient OFDM transmission techniques are well suited for use in portable devices, e.g., notebook computers, PDAs etc. In various embodiments, the transmission systems of the present invention illustrated in FIGS. 3A and 3B, with the exception of the antenna array, are mounted inside the housing of a portable device and powered by the portable devices power supply, e.g., a battery.

Numerous variations to the above described methods and exemplary embodiments may be made without departing from the scope of the inventions described herein. For example, while the use of multiple antennas for the transmission of a multi-tone signal are described, a single antenna may be used instead with all the tones being combined prior to broadcasting. In such an embodiment, multi-part prefixes and other features of the invention may still be used.

What is claimed is:

1. A multi-tone signal communications method for communicating information using N tones, where N is a positive integer greater than one, the method comprising:
    generating N analog signals, each one of the N analog signals corresponding to a different one of the N tones, wherein each of the N analog signals includes a periodic signal representing a symbol to be transmitted during a symbol transmission period;
    separately generating N signal prefixes, one signal prefix being generated for each one of the N analog signals from the one of the N periodic signals included in the corresponding one of the N analog signals, each of the N signal prefixes including multiple parts and wherein the step of separately generating N signal prefixes includes, for each one of the N analog signals:
        i) generating a first cyclic prefix part from the included periodic signal representing the current symbol; and
        ii) generating a second prefix part from the included periodic signal representing the preceding symbol and from the first cyclic prefix part; and
    transmitting the N analog signals into a communications channel using M antennas, where M is an integer and where $1<M<N$.

2. The method of claim 1, wherein M=N.

3. The method of claim 1, further comprising the step of: separately amplifying each of the N analog signals prior to transmitting said N analog signals.

4. The method of claim 3, wherein each of said N analog signals has a duration corresponding to said symbol transmission period.

5. The method of claim 4, wherein the N periodic signals and signal prefixes are generated in the passband.

6. The method of claim 3, wherein each of the N analog signals has a duration corresponding to multiple symbol transmission periods.

7. The method of claim 6, wherein each of the N periodic signals is a sinusoidal wave.

8. The method of claim 6, wherein each of the N periodic signals is a square wave.

9. The method of claim 1, wherein the step of generating a second prefix part includes cyclically extending the periodic signal representing the included preceding symbol and cyclically extending the first cyclic prefix part to correspond to the same time period; and
combining and attenuating the cyclically extended portion of the first cyclic prefix part and the cyclically extended portion to the included periodic signal representing the preceding symbol.

10. A multi-tone signal communications method for communicating information using N tones, where N is a positive integer greater than one, the method comprising:
    generating N analog signals, each one of the N analog signals corresponding to a different one of the N tones and wherein each of said N analog signals has a duration corresponding to at least a symbol transmission period and wherein each of the N analog signals includes a periodic signal representing a symbol to be transmitted during said symbol transmission period;
    separately generating N signal prefixes, one signal prefix being generated for each one of the N analog signals from the one of the N periodic signals included in the corresponding one of the N analog signals;
    separately amplifying each of the N analog signals prior to transmitting said N analog signals; and
    transmitting the N analog signals into a communications channel using N antennas, where N is an integer and where $1<M\leq N$,
    wherein each of the N signal prefixes includes multiple parts and wherein the step of separately generating N signal prefixes includes, for each one of the N analog signals:
    generating a first cyclic prefix part from the included periodic signal representing the current symbol; and
    generating a second prefix part to be a periodic signal, the beginning of the generated second prefix part having the same phase as the end of the periodic signal representing the preceding symbol and the end of the generated second prefix part having the same phase as the beginning of the first cyclic prefix part.

11. A multi-tone signal communications method for communicating information using N tones, where N is a positive integer greater than one, the method comprising:
    generating in parallel, for each one of the N tones, a separate periodic signal including at least one high order harmonic signal component that is different from the fundamental frequency signal component of said tone, wherein the generated periodic signal includes a square wave; and
    transmitting the generated N periodic signals into a communications channel.

12. The method of claim 11, wherein the periodic signal generated for each of the N tones, includes multiple high order harmonic signal components.

13. The method of claim 11, further comprising:
    generating, in parallel, for each one of the N tones, a separate periodic signal prefix.

14. The method of claim 13, wherein the step of generating a separate periodic signal prefix for each one of the N tones includes, for each one of the N generated prefixes:
    generating a cyclic prefix portion; and
    generating a continuity signal portion, the continuity signal portion being generated as a function of a previously generated periodic signal and the current generated periodic signal.

15. The method of claim 13, further comprising, for each one of the N tones, combining in the passband, the periodic signal corresponding to the one of the N tones with the corresponding one of the N periodic signal prefixes.

16. A multi-tone signal communications method for communicating information using at least N tones, where N is a positive integer greater than one, the method comprising:

separately generating, for each one of the N tones, a passband periodic signal representing a symbol, at least some of the N generated passband periodic signals include a high order harmonic signal component in addition to a fundamental frequency signal component, the high order harmonic signal component having a frequency which is higher than the frequency of the fundamental signal component; and transmitting the N generated passband periodic signals.

17. The method of claim 16, wherein the passband periodic signals for each one of the N tones are generated in parallel; and wherein the step of transmitting the N generated passband periodic signals includes broadcasting different ones of said N passband periodic signals using different antennas.

18. The method of claim 16, further comprising:

combining at least some of the N generated passband periodic signals prior to transmission.

19. The method of claim 16, wherein each of the N generated periodic signals is a square wave.

20. The method of claim 16, further comprising:

generating, a separate prefix for each of the N generated passband periodic signals; and combining, prior to transmission, each one of the separate prefixes with the corresponding one of the N generated passband periodic signals.

21. The method of claim 20, wherein the prefixes for each of the N passband periodic signals are generated in parallel.

22. The method of claim 20, wherein the step of combining each one of the separate prefixes with the corresponding one of the N generated passband periodic signals includes:

prepending the generated prefix to the corresponding one of the N generated passband periodic signals.

23. The method of claim 20, wherein generating a separate prefix for each of the N generated passband periodic signals includes, for each separate prefix:

generating a first cyclic prefix part; and generating a second prefix part, the second prefix part being generated using a different generation technique than the first prefix part.

24. A periodic signal processing method, the method comprising:

generating a multi-part prefix from a first periodic signal, the step of generating a multi-part prefix from the first periodic signal including:

performing a cyclic extension operation on the first periodic signal to generate a cyclic prefix portion;

processing the cyclic prefix portion to generate a continuity prefix portion from the cyclic prefix portion; and appending the cyclic prefix portion to the end of the continuity prefix portion; and communicating a signal including the generated multi-part prefix to a transmitter.

25. A periodic signal processing method, the method comprising:

generating a multi-part prefix from a first periodic signal, the step of generating a multi-part prefix from the first periodic signal including:

performing a cyclic extension operation on the first periodic signal to generate a cyclic prefix portion;

processing a preceding periodic signal to generate a continuity prefix portion from the preceding periodic signal; and appending the cyclic prefix portion to the end of the continuity prefix portion; and communicating a signal including the generated multi-part prefix to a transmitter.

26. A periodic signal processing method, the method comprising:

generating a multi-part prefix from a first periodic signal, the step of generating a multi-part prefix from the first periodic signal including:

performing a cyclic extension operation on the first periodic signal to generate a cyclic prefix portion;

processing the cyclic prefix portion and a preceding periodic signal to generate a continuity prefix portion from both the cyclic prefix portion and the preceding periodic signal; and appending the cyclic prefix portion to the end of the continuity prefix portion; and communicating a signal including the generated multi-part prefix to a transmitter.

27. The method of claim 26, wherein said processing of the cyclic prefix portion and a preceding periodic signal includes:

performing a cyclic extension operation on the cyclic prefix portion to generate a first cyclic extension;

performing another cyclic extension operation on the preceding periodic signal to generate a second cyclic extension, the first and second cyclic extensions corresponding to a signal time period which is the same for both the first and second cyclic extensions; and combining the first and second cyclic extensions corresponding to said signal time period to generate said continuity prefix portion, the step of combining the first and second cyclic extensions including:

windowing the combined cyclic extensions using an attenuating window.

28. The method of claim 27, wherein each of said cyclic extension operations includes copying a portion of the signal upon which said cyclic extension operation is performed.

29. A periodic signal processing method, the method comprising:

generating a multi-part prefix from a first periodic signal, the step of generating a multi-part prefix from the first periodic signal including:

performing a cyclic extension operation on the first periodic signal to generate a cyclic prefix portion;

generating a continuity prefix portion;

appending the cyclic prefix portion to the end of the continuity prefix portion; and wherein the continuity prefix portion has a frequency which is different from the frequency of the first periodic signal but has a phase at the point where the cyclic prefix portion is appended to the continuity prefix portion that is the same as the phase of the beginning of the cyclic prefix portion; and communicating a signal including the generated multi-part prefix to a transmitter.

30. A periodic signal processing method, the method comprising:

generating a multi-part prefix from a first periodic signal, the step of generating a multi-part prefix from the first periodic signal including:

performing a cyclic extension operation on the first periodic signal to generate a cyclic prefix portion;

generating a continuity prefix portion;

appending the cyclic prefix portion to the end of the continuity prefix portion; and wherein the continuity prefix portion has a phase at the beginning of the continuity prefix portion that is the same as the phase of the end of a preceding periodic signal; and
communicating a signal including the generated multi-part prefix to a transmitter.

31. A periodic signal processing method, the method comprising:
generating a multi-part prefix from a first periodic signal, the step of generating a multi-part prefix from the first periodic signal including:
performing a cyclic extension operation on the first periodic signal to generate a cyclic prefix portion;
generating a continuity prefix portion;
appending the cyclic prefix portion to the end of the continuity prefix portion; and
wherein the first periodic signal is one of N period signals corresponding to N different tones of a multi-tone signal, where N is a positive integer greater than one, the method further including:
generating for each of the N periodic signals, other than the first periodic signal, a separate multi-part prefix from a corresponding one of the N periodic signals, thereby generating N−1 multi-part signal prefixes in addition to the multi-part prefix generated from the first periodic signal; and
communicating a signl including the generated multi-part prefix to a transmitter.

32. The method of claim 31, further comprising:
prepending each of the generated N−1 multi-part prefixes and the generated multi-part prefix generated from the first periodic signal to the corresponding ones of the N periodic signals from which the multi-part prefixes were generated.

33. A periodic signal processing method, the method comprising:
generating a multi-part prefix from a first periodic signal, the step of generating a multi-part prefix from the first periodic signal including:
performing a cyclic extension operation on the first periodic signal to generate a cyclic prefix portion;
generating a continuity prefix portion;
appending the cyclic prefic portion to the end of the continuity prefix portion; and
wherein the first periodic signal is one of N period signals corresponding to N different tones of a multi-tone signal, where N is a positive integer greater than one, the method further including:
generating for each of the N periodic signals, other than the first periodic signal, a separate multi-part prefix from a corresponding one of the N periodic signals, thereby generating N-1 multi-part signal prefixes in addition to the multi-part prefix generated from the first periodic signal;
prepending each of the generated N-1 multi-part prefixes and the generated multi-part prefix generated from the first periodic signal to the corresponding ones of the N periodic signals from which the multi-part prefixes were generated;
filtering each of the N periodic signals with prepended multi-part prefixes in parallel; and
transmitting the filtered N periodic signals with prepended multi-part prefixes into a communications channel.

34. The method of claim 33, wherein the step of transmitting the filtered N periodic signals with prepended multi-part prefixes includes broadcasting different ones of the N periodic signals using different antennas.

35. The method of claim 34, further comprising:
allowing the N broadcast periodic signals to combine in the communications channel to form an N tone OFDM signal.

36. A method of sequentially transmitting symbols in a multi-tone signal communication system using N tones per symbol period, wherein the N tones remain the same for multiple symbol periods, the time period in which the N tones remain the same being a dwell, the method comprising:
for each symbol transmission period of the dwell:
rotating a constellation of symbols from which consecutive symbols are transmitted using one of said N tones by a fixed amount and which is a function of the duration of a multi-part prefix to be transmitted and with the selected symbol, wherein said fixed amount by which the constellation of symbols is rotated is a function of the tone frequency used;
selecting a symbol to be transmitted from a constellation of symbols to be transmitted using a signal corresponding to one of said N tones; and
transmitting N signals corresponding to each one of the N tones of the multi-tone signal, each one of the N signals being transmitted on a corresponding one of a first plurality of antennas, the antenna being used to transmit signals corresponding to a particular tone during the dwell remaining the same throughout the dwell.

37. The method of claim 36, further comprising the step of:
for each symbol transmission period of a second dwell:
transmitting N signals corresponding to each one of the N tones of the multi-tone signal, each one of the N signals being transmitted on a corresponding one of a second plurality of antennas, the antenna being used to transmit signals corresponding to a particular tone during the second dwell remaining the same throughout the second dwell, the second plurality of antennas including at least one antenna which is different from the antennas included the first plurality of antennas.

38. The method of claim 36, wherein the rotation of the constellation during each of the plurality of symbol transmission period has a cumulative rotational effect on the constellation from which symbols are selected causing the rotation of the symbols in one symbol transmission period to effect the constellation from which symbols are selected during the next symbol transmission period.

39. The method of claim 36, wherein the rotation of the constellation during each of the plurality of symbol transmission periods is by a fixed additive amount which does not effect the position of the symbols in the constellation from which the next symbol is selected.

40. A system for generating and transmitting signals corresponding to an N tone multi-tone signal, where N is a positive integer greater than 1, the system comprising:
N periodic signal generator circuits for generating periodic signals, each periodic signal corresponding to a different tone one of the N tones of the multi-tone signal, wherein each of the N periodic signal generator circuits includes a square wave generator, each one of said N periodic signals including a square wave having a frequency component corresponding to one of said N tones of the multi-tone signal; and
N prefix generator circuits for independently generating periodic signal prefixes, each one of the N prefix generator circuits being coupled to a different corresponding one of the N periodic generator circuits.

41. The system of claim 40, further comprising:
N filters for independently filtering the N periodic signals including prefixes generated by the N prefix generator circuits, each one of the N filters being coupled to a different corresponding one of the N prefix generator circuits.

42. The system of claim 41, further comprising:
a plurality of M antennas, where M is an integer and where 1 <M<N, each of the N filters being coupled to a single one of the M antennas and each one of the M antennas being coupled to at least one of the N filters.

43. The system of claim 42, wherein M=N.

44. The system of claim 43, wherein M<N, the system further comprising, at least one analog combing circuit for combining signals from a subset of said N filters into a signal filter and for coupling each filter in the subset of said N filters one of said M antennas.

45. The system of claim 40, wherein each of the N prefix generator circuits generates a separate prefix, each one of the N separate prefixes having the same duration.

46. A communications apparatus, comprising:
a periodic signal generator module for generating a first periodic signal; and
a prefix generation module for generating a multi-part prefix from a first periodic signal, the prefix generation module including:
means for performing a cyclic extension operation on the first periodic signal to generate a cyclic prefix portion;
means for processing the cyclic prefix portion to generate a continuity prefix portion from the cyclic prefix portion; and
means for appending the cyclic prefix portion to the end of the continuity prefix portion.

47. A communications apparatus, comprising:
a periodic signal generator module for generating a first periodic signal; and
a prefix generation module including:
means for generating a multi-part prefix from a first periodic signal by performing a cyclic extension operation on the first periodic signal to generate a cyclic prefix portion;
means for processing a preceding periodic signal to generate a continuity prefix portion from the preceding periodic signal; and
means for appending the cyclic prefix portion to the end of the continuity prefix portion.

48. A multi-tone signal communications apparatus for communicating information using N tones, where N is a positive integer greater than one, the apparatus comprising:
means for generating N analog signals, each one of the N analog signals corresponding to a different one of the N tones, wherein each of the N analog signals includes a periodic signal representing a symbol to be transmitted during a symbol transmission period;
means for separately generating N signal prefixes, one signal prefix being generated for each one of the N analog signals from the one of the N periodic signals included in the corresponding one of the N analog signals, each of the N signal prefixes including multiple parts, said means for separately generating N signal prefixes including, for each one of the N analog signals:
i) means for generating a first cyclic prefix part from the included periodic signal representing the current symbol; and
ii) means for generating a second prefix part from the included periodic signal representing the preceding symbol and from the first cyclic prefix part; and
means for transmitting the N analog signals into a communications channel using M antennas, where M is an integer and where 1<M<N.

49. The apparatus of claim 48, wherein M=N.

50. The apparatus of claim 48, further comprising the step of:
means for separately amplifying each of the N analog signals prior to transmitting said N analog signals.

51. The apparatus of claim 50, wherein each of said N analog signals has a duration corresponding to said symbol transmission period.

52. A multi-tone signal communications apparatus for communicating information using N tones, where N is a positive integer greater than one, the apparatus comprising:
a processor configured to:
generate N analog signals, each one of the N analog signals corresponding to a different one of the N tones, wherein each of the N analog signals includes a periodic signal representing a symbol to be transmitted during a symbol transmission period;
separately generate N signal prefixes, one signal prefix being generated for each one of the N analog signals from the one of the N periodic signals included in the corresponding one of the N analog signals, each of the N signal prefixes including multiple parts, said separately generating N signal prefixes including, for each one of the N analog signals:
generating a first cyclic prefix part from the included periodic signal representing the current symbol; and
generating a second prefix part from the included periodic signal representing the preceding symbol and from the first cyclic prefix part; and
communicate the N analog signals to a transmitter for transmission into a communications channel using M antennas, where M is an integer and where 1<M<N.

53. A communications apparatus for communicating information using N tones, where N is a positive integer greater than one, the apparatus comprising:
means for generating N analog signals, each one of the N analog signals corresponding to a different one of the N tones and wherein each of said N analog signals has a duration corresponding to at least a symbol transmission period and wherein each of the N analog signals includes a periodic signal representing a symbol to be transmitted during said symbol transmission period;
means for separately generating N signal prefixes, one signal prefix being generated for each one of the N analog signals from the one of the N periodic signals included in the corresponding one of the N analog signals;
means for separately amplifying each of the N analog signals prior to transmitting said N analog signals; and
means for transmitting the N analog signals into a communications channel using M antennas, where M is an integer and where 1<M≦N,
wherein each of the N signal prefixes includes multiple parts and wherein the means for separately generating N signal prefixes includes, for each one of the N analog signals:
means for generating a first cyclic prefix part from the included periodic signal representing the current symbol; and
means for generating a second prefix part to be a periodic signal, the beginning of the generated second prefix part having the same phase as the end of the periodic signal representing the preceding symbol and the end of the generated second prefix part having the same phase as the beginning of the first cyclic prefix part.

54. The apparatus of claim 53, wherein each of the N periodic signals is a sinusoidal wave.

55. The apparatus of claim 53, wherein each of the N periodic signals is a square wave.

56. A multi-tone signal communications apparatus for communicating information using N tones, where N is a positive integer greater than one, the apparatus comprising:
a processor configured to:
generate N analog signals, each one of the N analog signals corresponding to a different one of the N tones and wherein each of said N analog signals has a duration corresponding to at least a symbol transmission period and wherein each of the N analog signals includes a periodic signal representing a symbol to be transmitted during said symbol transmission period;
separately generate N signal prefixes, one signal prefix being generated for each one of the N analog signals from the one of the N periodic signals included in the corresponding one of the N analog signals;
separately amplify each of the N analog signals prior to transmitting said N analog signals; and
communicate the N analog signals to M antennas for transmission into a communications channel, where M is an integer and where 1<M≦N,
wherein each of the N signal prefixes includes multiple parts; and
wherein the processor is configured to, as part of separately generating N signal prefixes:
generate a first cyclic prefix part from the included periodic signal representing the current symbol; and
generate a second prefix part to be a periodic signal, the beginning of the generated second prefix part having the same phase as the end of the periodic signal representing the preceding symbol and the end of the generated second prefix part having the same phase as the beginning of the first cyclic prefix part.

57. A multi-tone signal communications apparatus for communicating information using N tones, where N is a positive integer greater than one, the apparatus comprising:
means for generating in parallel, for each one of the N tones, a separate periodic signal including at least one high order harmonic signal component that is different from the fundamental frequency signal component of said tone, wherein the generated periodic signal includes a square wave; and
means for transmitting the generated N periodic signals into a communications channel.

58. The apparatus of claim 57, wherein the periodic signal generated for each of the N tones, includes multiple high order harmonic signal components.

59. The apparatus of claim 57, further comprising:
means for generating, in parallel, for each one of the N tones, a separate periodic signal prefix.

60. A multi-tone signal communications apparatus for communicating information using N tones, where N is a positive integer greater than one, the apparatus comprising:
a processor configured to:
generate in parallel, for each one of the N tones, a separate periodic signal including at least one high order harmonic signal component that is different from the fundamental frequency signal component of said tone, wherein the generated periodic signal includes a square wave; and
communicate the generated N periodic signals to a transmission device for transmission into a communications channel.

61. A computer readable medium embodying machine executable instructions for controlling a communications device to implement a method of communicating with another device using a multi-tone signal including N tones, where N is a positive integer greater than one, the method comprising:
generating in parallel, for each one of the N tones, a separate periodic signal including at least one high order harmonic signal component that is different from the fundamental frequency signal component of said tone, wherein the generated periodic signal includes a square wave; and
transmitting the generated N periodic signals into a communications channel.

62. A multi-tone signal communications apparatus for communicating information using at least N tones, where N is a positive integer greater than one, the method comprising:
means for separately generating, for each one of the N tones, a passband periodic signal representing a symbol, at least some of the N generated passband periodic signals include a high order harmonic signal component in addition to a fundamental frequency signal component, the high order harmonic signal component having a frequency which is higher than the frequency of the fundamental signal component; and
means for transmitting the N generated passband periodic signals.

63. The apparatus of claim 62, wherein the pasaband periodic signals for each one of the N tones are generated in parallel; and
wherein the means for transmitting the N generated passband periodic signals includes different antennas for broadcasting different ones of said N passband periodic signals.

64. The apparatus of claim 62, comprising:
means for combining at least some of the N generated paseband periodic signals prior to transmission.

65. A multi-tone signal communications apparatus for communicating information using at least N tones, where N is a positive integer greater than one, the apparatus comprising:
a processor configured to:
separately generate, for each one of the N tones, a passband periodic signal representing a symbol, at least some of the N generated passband periodic signals include a high order harmonic signal component in addition to a fundamental frequency signal component, the high order harmonic signal component having a frequency which is higher than the frequency of the fundamental signal component; and
communicate the N generated pasaband periodic signals to a transmission device for transmission into a communications channel.

66. A communications apparatus comprising:
means for generating a multi-part prefix from a first periodic signal, the means for generating a multi-part prefix from the first periodic signal including:
i) means for performing a cyclic extension operation on the first periodic signal to generate a cyclic prefix portion;

ii) means for processing the cyclic prefix portion to generate a continuity prefix portion from the cyclic prefix portion; and iii) means for appending the cyclic prefix portion to the end of the continuity prefix portion; and means for communicating a signal including the generated multi-part prefix to a transmitter.

67. A communications apparatus comprising:

a processor configured to:

generate a multi-part prefix from a first periodic signal by:

performing a cyclic extension operation on the first periodic signal to generate a cyclic prefix portion;

processing the cyclic prefix portion to generate a continuity prefix portion from the cyclic prefix portion; and appending the cyclic prefix portion to the end of the continuity prefix portion; and communicate a signal including the generated multi-part prefix to a transmitter.

68. A communications apparatus, comprising:

means for generating a multi-part prefix from a first periodic signal, the step of generating a multi-part prefix from the first periodic signal including:

means for performing a cyclic extension operation on the first periodic signal to generate a cyclic prefix portion;

means for processing a preceding periodic signal to generate a continuity prefix portion from the preceding periodic signal; and means for appending the cyclic prefix portion to the end of the continuity prefix portion; and means for communicating a signal including the generated multi-part prefix to a transmitter.

69. A communications apparatus, comprising:

a processor configured to:

generate a multi-part prefix from a first periodic signal, generating a multi-part prefix from the first periodic signal including:

performing a cyclic extension operation on the first periodic signal to generate a cyclic prefix portion;

processing a preceding periodic signal to generate a continuity prefix portion from the preceding periodic signal; and appending the cyclic prefix portion to the end of the continuity prefix portion; and communicate a signal including the generated multi-part prefix to a transmitter.

70. A communications device, comprising:

means for generating a multi-part prefix from a first periodic signal, the means for generating a multi-part prefix from the first periodic signal including:

means for performing a cyclic extension operation on the first periodic signal to generate a cyclic prefix portion;

means for processing the cyclic prefix portion and a preceding periodic signal to generate a continuity prefix portion from both the cyclic prefix portion and the preceding periodic signal; and means for appending the cyclic prefix portion to the end of the continuity prefix portion; and means for communicating a signal including the generated multi-part prefix to a transmitter.

71. The apparatus of claim 70, wherein said means for processing of the cyclic prefix portion and a. preceding periodic signal includes:

means for performing a cyclic extension operation on the cyclic prefix portion to generate a first cyclic extension;

means for performing another cyclic extension operation on the preceding periodic signal to generate a second cyclic extension, the first and second cyclic extensions corresponding to a signal time period which is the same for both the first and second cyclic extensions; and means for combining the first and second cyclic extensions corresponding to said signal time period to generate said continuity prefix portion, the means for combining the first and second cyclic extensions including:

means for windowing the combined cyclic extensions using an attenuating window.

72. The apparatus of claim 71, wherein each of said means for performing cyclic extension operations includes means for copying a portion of the signal upon which said cyclic extension operation is performed.

73. A communications device, comprising:

a processor configured to:

generate a multi-part prefix from a first periodic signal, generating a multi-part prefix from the first periodic signal including:

performing a cyclic extension operation on the first periodic signal to generate a cyclic prefix portion;

processing the cyclic prefix portion and a preceding periodic signal to generate a continuity prefix portion from both the cyclic prefix portion and the preceding periodic signal; and appending the cyclic prefix portion to the end of the continuity prefix portion; and communicate a signal including the generated multi-part prefix to a transmitter.

74. A first communications device, comprising:

means for generating a multi-part prefix from a first periodic signal, the means for generating a multi-part prefix from the first periodic signal including:

means for performing a cyclic extension operation on the first periodic signal to generate a cyclic prefix portion;

means for generating a continuity prefix portion;

means for appending the cyclic prefix portion to the end of the continuity prefix portion; and wherein the continuity prefix portion has a frequency which is different from the frequency of the first periodic signal but has a phase at the point where the cyclic prefix portion is appended to the continuity prefix portion that is the same as the phase of the beginning of the cyclic prefix portion; and means for communicating a signal including the generated multi-part prefix to a second device.

75. A communications device, comprising:

a processor configured to:

generate a multi-part prefix from a first periodic signal, generating a multi-part prefix from the first periodic signal including:

performing a cyclic extension operation on the first periodic signal to generate a cyclic prefix portion;

generating a continuity prefix portion;

appending the cyclic prefix portion to the end of the continuity prefix portion; and communicate a signal including the generated multi-part prefix to a second device; and wherein the continuity prefix portion has a frequency which is different from the frequency of the first periodic signal but has a phase at the point where the cyclic prefix portion is appended to the continuity prefix portion that is the same as the phase of the beginning of the cyclic prefix portion.

76. A first communications device, comprising:
means for generating a multi-part prefix from a first periodic signal, the means for generating a multi-part prefix from the first periodic signal including:
means for performing a cyclic extension operation on the first periodic signal to generate a cyclic prefix portion;
means for generating a continuity prefix portion;
means for appending the cyclic prefix portion to the end of the continuity prefix portion; and
wherein the continuity prefix portion has a phase at the beginning of the continuity prefix portion that is the same as the phase of the end of a preceding periodic signal; and
means for communicating a signal including the generated multi-part prefix to a second device.

77. An apparatus for sequentially transmitting symbols in a multi-tone signal communication system using N tones per symbol period, wherein the N tones remain the same for multiple symbol periods, the time period in which the N tones remain the same being a dwell, the apparatus comprising:
means for rotating a constellation of symbols from which consecutive symbols are transmitted using one of said N tones by a fixed amount and which is a function of the duration of a multi-part prefix to be transmitted and with the selected symbol, wherein said fixed amount by which the constellation of symbols is rotated is a function of the tone frequency used;
means for selecting a symbol to be transmitted from a constellation of symbols to be transmitted using a signal corresponding to one of said N tones; and
means for transmitting N signals corresponding to each one of the N tones of the multi-tone signal, each one of the N signals being transmitted on a corresponding one of a first plurality of antennas, the antenna being used to transmit signals corresponding to a particular tone during the dwell remaining the same throughout the dwell.

78. The apparatus of claim 77, further comprising
means for transmitting N signals corresponding to each one of the N tones of the multi-tone signal, each one of the N signals being transmitted on a corresponding one of a second plurality of antennas, the antenna being used to transmit signals corresponding to a particular tone during a second dwell remaining the same throughout second dwell, the second plurality of antennas including at least one antenna which is different from the antennas included the first plurality of antennas.

79. An apparatus for sequentially transmitting symbols in a multi-tone signal communication system using N tones per symbol period, wherein the N tones remain the same for multiple symbol periods, the time period in which the N tones remain the same being a dwell, the apparatus comprising:
a processor configured to:
rotate a constellation of symbols from which consecutive symbols are transmitted using one of said N tones by a fixed amount and which. is a function of the duration of a multi-part prefix to be transmitted and with the selected symbol, wherein said fixed amount by which the constellation of symbols is rotated is a function of the tone frequency used;
select a symbol to be transmitted from a constellation of symbols to be transmitted using a signal corresponding to one of said N tones; and
communicate N signals corresponding to each one of the N tones of the multi-tone signal to a corresponding one of a first plurality of antennas, respectively, the antenna being used to transmit signals corresponding to a particular tone during the dwell remaining the same throughout the dwell.

80. A system for generating and transmitting signals corresponding to an N tone multi-tone signal, where N is a positive integer greater than 1, the system comprising:
N periodic signal generator modules for generating periodic signals, each periodic signal corresponding to a different tone one of the N tones of the multi-tone signal, wherein each of the N periodic signal generator circuits includes a square wave generator, each one of said N periodic signals including a square wave having a frequency component corresponding to one of said N tones of the multi-tone signal; and
N prefix generator modules for independently generating periodic signal prefixes, each one of the N prefix generator modules being coupled to a different corresponding one of the N periodic generator modules.

81. The system of claim 80, further comprising:
N filter modules for, independently filtering the N periodic signals including prefixes generated by the N prefix generator modules, each one of the N filters being coupled to a different corresponding one of the N prefix generator modules.

* * * * *